United States Patent [19]

Zanzig et al.

[11] Patent Number: 5,552,490

[45] Date of Patent: Sep. 3, 1996

[54] STYRENE-ISOPRENE RUBBER FOR TIRE TREAD COMPOUNDS

[75] Inventors: David J. Zanzig, Uniontown; Paul H. Sandstrom, Tallmadge; Joseph K. Hubbell, Akron; Wen-Liang Hsu, Copley; Adel F. Halasa, Bath; John J. A. Verthe, Kent, all of Ohio

[73] Assignee: The Goodyear Tire & Rubber Company, Akron, Ohio

[21] Appl. No.: 439,753

[22] Filed: May 12, 1995

Related U.S. Application Data

[60] Division of Ser. No. 300,907, Sep. 6, 1994, Pat. No. 5,470,929, which is a continuation-in-part of Ser. No. 37,835, Mar. 29, 1993, Pat. No. 5,359,016.

[51] Int. Cl.$^6$ .................... C08L 9/06; C08K 3/36
[52] U.S. Cl. .................... 525/237; 525/232; 524/262; 524/575; 152/209 R
[58] Field of Search .................... 524/575, 262; 525/233, 237, 232, 332.9; 152/209 R, 450

[56] References Cited

U.S. PATENT DOCUMENTS

| | | | |
|---|---|---|---|
| 3,938,574 | 2/1976 | Burmester et al. | 525/232 X |
| 4,519,430 | 5/1985 | Ahmad et al. | 524/575 X |
| 5,317,062 | 5/1994 | Rogers et al. | 525/237 |
| 5,336,730 | 8/1994 | Sandstrom et al. | 525/262 X |
| 5,359,016 | 10/1994 | Hsu et al. | 526/181 |

FOREIGN PATENT DOCUMENTS

| | | | |
|---|---|---|---|
| 8204036 | 11/1983 | Japan | 525/237 |

*Primary Examiner*—Fred Teskin
*Attorney, Agent, or Firm*—Alvin T. Rockhill

[57] ABSTRACT

The subject invention relates to a technique for synthesizing rubbery copolymers of styrene and isoprene. These rubbery copolymers exhibit an excellent combination of properties for utilization in tire tread rubber compounds. By utilizing these styrene-isoprene rubbers in tire treads, tires having improved wet skid resistance can be built without sacrificing rolling resistance or tread wear characteristics. This invention more specifically discloses a process for the synthesis of styrene-isoprene rubbers which exhibit essentially a single glass transition temperature and which are particularly useful in tire tread rubber compounds, said process comprising copolymerizing a monomer mixture containing from about 2 weight percent to about 15 weight percent styrene monomer and from about 85 weight percent to about 98 weight percent isoprene monomer in an organic solvent in the presence of a catalyst system which is comprised of (a) a lithium initiator and (b) a modifier having the structural formula:

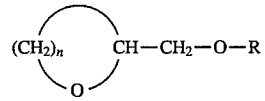

wherein n represents an integer within the range of 3 to 6, wherein R represents an alkyl group containing from 1 to about 10 carbon atoms, and wherein the molar ratio of the modifier to the lithium initiator is within the range of 2:1 to 40:1.

3 Claims, No Drawings

STYRENE-ISOPRENE RUBBER FOR TIRE TREAD COMPOUNDS

This patent application is a divisional of application Ser. No. 08/300,907, filed on Sep. 6, 1994, issued as U.S. Pat. No. 5,470,929, which is a continuation-in-part application of U.S. patent application Ser. No. 08/037,835, filed on Mar. 29, 1993 (now issued as U.S. Pat. No. 5,359,016).

BACKGROUND OF THE INVENTION

It is highly desirable for tires to have good wet skid resistance, low rolling resistance, and good wear characteristics. It has traditionally been very difficult to improve a tire's rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For example, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120 these polymers are made by polymerizing at lease one conjugated diolefin in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally initiated with an organolithium initiator and are generally carried out in an inert organic solvent.

U.S. Pat. No. 5,137,998 discloses that terpolymers of styrene, isoprene, and butadiene which exhibit multiple viscoelastic responses result from terpolymerizations of styrene, isoprene, and 1,3-butadiene in the presence of an alkali metal alkoxide and an organolithium initiator. By utilizing this technique, such terpolymers which exhibit multiple glass transition temperatures can be prepared in a single reaction zone. The SIBR (styrene-isoprenebutadiene rubber) made by the technique of U.S. Pat. No. 5,137,998 offers an outstanding combination of properties for utilization in making tire tread rubber compounds. For example, utilizing such SIBR in tire tread compounds results in improved wet skid resistance without sacrificing rolling resistance or tread wear characteristics.

It is known in the art that 3,4-polyisoprene can be used in tire tread compounds to improve tire performance characteristics, such as traction. Polar modifiers are commonly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers.

U.S. Pat. No. 4,696,986 describes the use of 1,2,3-trialkoxybenzenes and 1,2,4-trialkoxybenzenes as modifiers. The vinyl group content of polydienes prepared utilizing Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints; Vol. 7 (1), 132 [1966]). For this reason it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. However, it has traditionally been difficult to prepare polymers having high vinyl contents at temperatures which are high enough to attain maximum polymerization rates while utilizing conventional Lewis bases as modifiers.

U.S. Pat. No. 5,231,153 reports that compounds having the following structural formulae can be used as modifiers in the synthesis of polydienes:

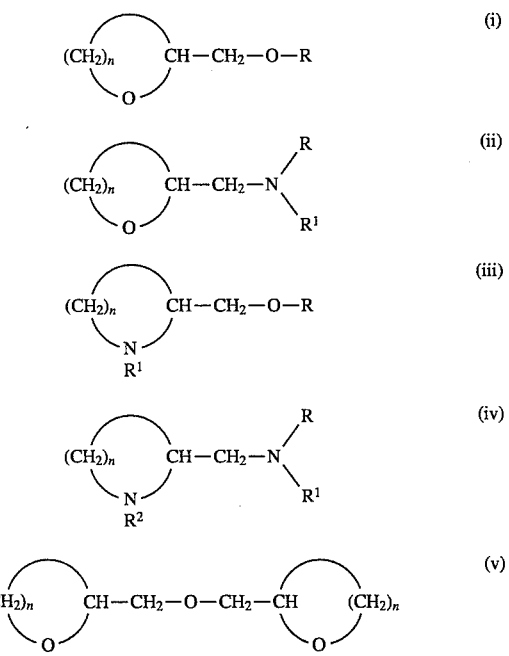

3

-continued

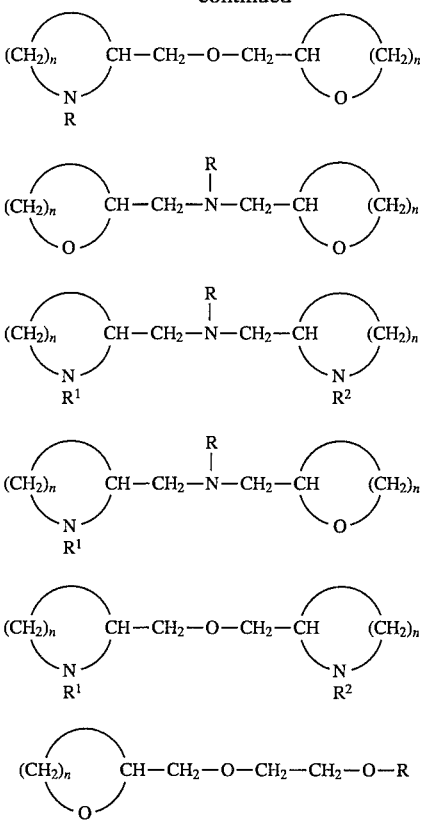

wherein n represents an integer within the range of 3 to 6, and wherein R, R¹, and R² can be the same or different and represent alkyl groups containing from 1 to 10 carbon atoms, aryl groups containing from 6 to carbon atoms, or hydrogen atoms.

U.S. Pat. No. 5,231,153 reports that these modifiers remain stable at conventional polymerization temperatures and lead to the formation of polymers having high vinyl contents at such temperatures. Accordingly, they can be used to promote the formation of high vinyl polymers at temperatures which are high enough to promote very fast polymerization rates.

Japenese Patent 5255540 to Noriyuki which is assigned to Toyo Tire & Rubber discloses a rubber composition for pneumatic tire treads which is reported to provide improved wear and skid resistance. This tire tread compound is comprised of a styrene-isoprene copolymer, a styrene-butadiene copolymer, and carbon black. These compositions contain 50 to 150 parts by weight of carbon black per 100 parts by weight of the rubbers in the compound.

SUMMARY OF THE INVENTION

It has been unexpectedly found that rubbery copolymers of styrene and isoprene which exhibit essentially a single glass transition temperature can be synthesized utilizing lithium initiators and an alkyl tetrahydrofurfuryl ether modifier when the molar ratio of modifier to the lithium initiator is within the range of 2:1 to 40:1. It has further been unexpectedly found that 2,2-ditetrahydrofurylpropane can be used as the modifier to produce such styrene-isoprene rubbers having essentially a single glass transition temperature at molar ratios of the modifier to the lithium initiator of greater than 1:1. In such techniques it is important for the ratio of styrene to isoprene to be less than about 15:85. The styrene-isoprene rubbers made utilizing the techniques of this invention typically contain from about 2 weight percent to about 15 weight percent styrene and from about 85 weight percent to about 98 weight percent isoprene.

By utilizing this technique, such copolymers which exhibit essentially a single glass transition temperature can be prepared in a single reaction zone. The styrene-isoprene rubber made by the technique of this invention offers an outstanding combination of properties for utilization in making tire tread rubber compounds. For example, utilizing such styrene-isoprene rubbers in tire tread compounds results in improved wet skid resistance without sacrificing rolling resistance or tread wear characteristics. Improved wet and dry handling as well as improved treadwear characteristics can also be realized by utilizing the styrene-isoprene rubbers of this invention in tire tread compounds.

The subject invention more specifically discloses a process for the synthesis of styrene-isoprene rubbers which exhibit essentially a single glass transition temperature and which are particularly useful in tire tread rubber compounds, said process comprising copolymerizing a monomer mixture containing from about 2 weight percent to about 15 weight percent styrene monomer and from about 85 weight percent to about 98 weight percent isoprene monomer in an organic solvent in the presence of a catalyst system which is comprised of (a) a lithium initiator and (b) a modifier having the structural formula:

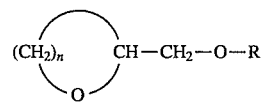

wherein n represents an integer within the range of 3 to 6, wherein R represents an alkyl group containing from 1 to about 10 carbon atoms, and wherein the molar ratio of the modifier to the lithium initiator is within the range of 2:1 to 40:1.

The subject invention also reveals a process for the synthesis of styrene-isoprene rubbers which exhibit essentially a single glass transition temperature and which are particularly useful in tire tread rubber compounds, said process comprising copolymerizing a monomer mixture containing from about 2 weight percent to about 15 weight percent styrene monomer and from about 85 weight percent to about 98 weight percent isoprene monomer in an organic solvent in the presence of a catalyst system which is comprised of (a) a lithium initiator and (b) 2,2-ditetrahydrofurylpropane as a modifier, wherein the molar ratio of the modifier to the lithium initiator is within the range of 1:1 to 40:1.

There are valuable benefits associated with utilizing the styrene-isoprene rubbers of this invention in making tire tread compounds. The present invention also discloses that a particularly preferred tire tread compound is comprised of, based on 100 parts by weight of rubber, (a) from about 5 parts to about 55 parts of the styrene-isoprene rubber, (b) from about 10 parts to about 40 parts of natural rubber, (c) from about 15 parts to about 40 parts of styrene-butadiene rubber, and (d) from about 20 parts to about 35 parts of high cis-1,4-polybutadiene rubber.

The subject invention further reveals a pneumatic tire having an outer circumferential tread where said tread is a sulfur cured rubber composition comprised of, based on 100 parts by weight of rubber, (a) from about 5 parts to about 55 parts of the styrene-isoprene rubber made by the process of this invention, (b) from about 10 parts to about 40 parts of natural rubber, (c) from about 10 parts to about 60 parts of styrene-butadiene rubber, and (d) from about 0 parts to about 50 parts of high cis-1,4-polybutadiene rubber.

DETAILED DESCRIPTION OF THE INVENTION

The relative amount of isoprene and styrene employed in synthesizing the rubbers of this invention will typically be within a very specific range. In practicing this invention, the weight ratio of styrene to isoprene in the monomer charge will typically be within the range of about 2:98 to 15:85. In most cases the monomer charge composition will contain from about 3 weight percent to about 10 weight percent styrene and from about 90 weight percent to 97 weight percent isoprene. It is normally preferred for the monomer charge composition to contain from about 4 weight percent to about 7 weight percent styrene and from about 93 weight percent to about 96 weight percent isoprene.

The polymerizations of the present invention which are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. The modifiers of this invention are also useful in bulk polymerizations which are initiated with lithium catalyst systems.

In solution polymerizations which utilize the modifiers of this invention, there will normally be from 5 to 35 weight percent monomers in the polymerization medium. Such polymerization mediums are, of course, comprised of an organic solvent, monomers, an organolithium initiator, and the modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compounded with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compounded with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The modifiers which can be employed in the synthesis of the styrene-isoprene rubbers of this invention include 2,2-ditetrahydrofurylpropane (DTP) and compounds which have the structural formula:

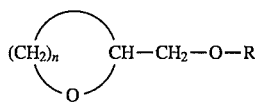

wherein n represents an integer within the range of 3 to 6, and wherein R represents alkyl groups containing from 1 to 10 carbon atoms.

As a general rule, n will represent the integer 3 or 4. More commonly n will represent the integer 3. The preferred types of modifiers are alkyl tetrahydrofurfuryl ethers, such as methyl tetrahydrofurfuryl ether, ethyl tetrahydrofurfuryl ether, propyl tetrahydrofurfuryl ether, butyl tetrahydrofurfuryl ether, pentyl tetrahydrofurfuryl ether, and hexyl tetrahydrofurfuryl ether. The most preferred modifier is hexyl tetrahydrofurfuryl ether.

The modifier being utilized can be introduced into the polymerization zone being utilized in any manner. In one embodiment, it can be reacted with the organometallic compound with the reaction mixture therefrom being introduced into the polymerization zone as the initiator. In another embodiment, the modifier can be introduced into the polymerization zone directly without first being reacted with the organometallic compound being utilized as the initiator. In other words, the modifiers can be introduced into the polymerization zone in the form of a reaction mixture with the organometallic initiator or they can be introduced into the polymerization zone separately.

The amount of modifier needed will vary with the vinyl content which is desired for the styrene-isoprene rubber being synthesized. However, in cases where an alkyl tetrahydrofurfuryl ether is utilized as the modifier at least 2 moles of the modifier per mole of lithium in the initiator will be utilized. If polymers having very high vinyl-contents are desired, then large quantities of the modifier can be used. However, normally there will be no reason to employ more than about 40 moles of the modifier per mole of lithium in the organometallic initiator system employed. In most cases from about 2 to about 15 moles of the alkyl tetrahydrofurfuryl ether modifier will be employed per mole of lithium metal in the organometallic initiator system utilized. Preferably from about 2 to 10 moles of the alkyl tetrahydrofurfuryl ether modifier will be utilized per mole of lithium with from about 2 to 5 moles of the alkyl tetrahydrofurfuryl ether modifier per mole of lithium being most preferred.

In cases where DTP is utilized as the modifier a molar ratio of DTP to the lithium in the initiator of at least 1:1 will be utilized. In most cases from about 2 to about 15 moles of the DTP modifier will be employed per mole of lithium metal in the organometallic initiator system utilized. Preferably from about 2 to 10 moles of the DTP modifier will be utilized per mole of lithium with from about 2 to 5 moles of the DTP modifier per mole of lithium being most preferred.

The polymerization temperature utilized can vary over a broad range of from about −20° C. to about 150° C. In most cases a temperature within the range of about 30° C. to about 125° C. will be utilized. Temperatures within the range of about 50° C. to about 90° C. are generally the most preferred polymerization temperatures. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, those which are preferred are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7odecadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxyo3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of coupling agent per equivalent of lithium is considered an optimum amount for maximum branching, if this result is desired in the production line. The coupling agent can be added in hydrocarbon solution, e.g., in cyclohexane, to the polymerization admixture in the final reactor with suitable mixing for distribution and reaction.

Styrene-isoprene rubbers which are made by utilizing the techniques of this invention in solution polymerizations can be recovered utilizing conventional techniques. In many cases it will be desirable to destroy residual carbon-lithium bonds which may be present in the polymer solution and to recover the synthetic styrene-isoprene rubber produced. It may also be desirable to add additional antioxidants to the polymer solution in order to further protect the polydiene produced from potentially deleterious effects of contact with oxygen. The styreneoisoprene rubber made can be precipitated from the polymer solution and any remaining lithium moieties can be inactivated by the addition of lower alcohols, such as isopropyl alcohol, to the polymer solution. The styrene-isoprene rubber can be recovered from the solvent and residue by means such as decantation, filtration, centrification, and the like. Steam stripping can also be utilized in order to remove volatile organic compounds from the rubber.

There are valuable benefits associated with utilizing the styrene-isoprene rubbers of this invention in making tire tread compounds. Such tire tread compounds are blends of the styrene-isoprene rubber with one or more additional sulfur curable elastomers. For instance, the styrene-isoprene rubber can be blended with natural rubbers and, optionally, high cis 1,4-polybutadiene and/or styrene-butadiene rubbers in making tire tread compounds.

One particularly preferred tire tread compound is comprised of, based on 100 parts by weight of rubber, (a) from about 5 parts to about 55 parts of the styrene-isoprene rubber, (b) from about 10 parts to about 40 parts of natural rubber, (c) from about 10 parts to about 60 parts of styrene-butadiene rubber, and (d) from about 0 parts to about 50 parts of high cis-1,4-polybutadiene rubber.

It is preferred for such tire tread compounds to further contain a silica filler. A combination of carbon black and silica can be employed. For instance, a combination of about 30 parts to about 80 parts of carbon black with about 10 parts to about 40 parts of silica can be usefully employed in such blends. The weight ratio of silica to carbon black will normally be at least 1:1. It is generally preferred for the weight ratio of silica to carbon black to be at least 4:1.

It is generally preferred to utilize blends which contain from about 60 parts to 100 parts of silica and essentially no carbon black. It is more preferred for the blends to contain from 60 parts to 80 parts of silica. Even though these blends contain essentially no carbon black as filler, it is contemplated that a small amount of carbon black will be incorporated into the blends as a black color imparting agent or used as a carrier for chemical additives, such as coupling agents. Generally, the amount of carbon black needed for color imparting purposes will be less than 10 parts per 100 parts of rubber in the blend and will typically be less than 5 part per 100 parts of rubber in the blend.

It is important to utilize a coupling agent in cases where silica is employed as a reinforcing filler. This is because at least as compared to carbon black, there tends to be a lack of, or at least an insufficient degree of, physical and/or chemical bonding between the silica particles and the rubber to enable the silica to become a sufficient reinforcing filler for the rubber for most purposes, including tire treads, if the silica is used without a coupler. While various treatments and procedures have been devised to overcome such deficiencies, coupling agents capable of reacting with both the silica surface and the rubber molecule are generally employed with great success. Such coupling agents may be premixed, or pre-reacted, with the silica particles or may be added to the rubber mix during the rubber/silica processing or mixing stage. If the coupling agent and silica are added separately to the rubber compound during the rubber/silica mixing, or processing stage, it is believed that the coupling agent then combines "in situ" with the silica.

Such coupling agents are generally composed of a silane which has a constituent component or moiety which is capable of reacting with the silica surface (the silane portion) and a constituent component or moiety which is capable of reacting with the rubbers in the blend. In this manner the coupling agent acts as a connecting bridge between the silica and the rubbers in the blend and thereby enhances the rubber reinforcement aspect of the silica.

In one type of coupling agent the silane apparently forms a bond to the silica surface, possibly through hydrolysis, and the rubber reactive component of the coupling agent chemically reacts with the rubber itself. Usually the rubber reactive component of the coupling agent is temperature sensitive and tends to chemically react with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stage and, thus, prior to a subsequent vulcanization stage.

The rubber-reactive group component of the coupling agent may be, for example, one or more mercapto groups, amino groups, vinyl groups, epoxy groups, and/or sulfur groups, preferably a sulfur or mercapto group. It is most preferred for the rubber-reactive group to be a sulfur group. Numerous coupling agents are known for use in combining silica and rubber. Representative examples of coupling agents which can be employed include silane coupling agents containing a polysulfide component, or structure, such as biso(3-triethoxysilylpropyl)tetrasulfide.

U.S. Pat. No. 3,451,458, U.S. Pat. No. 3,664,403, U.S. Pat. No. 3,768,537, U.S. Pat. No. 3,884,285, U.S. Pat. No. 3,938,574, U.S. Pat. No. 4,482,663, U.S. Pat. No. 4,590,052, U.S. Pat. No. 5,089,554, and British Patent 1,424,503 all relate to silicas and silica reinforced tire treads and the teaching of these patents are hereby incorporated herein by reference.

The high cis 1,4-polybutadiene utilized in such blends typically has a microstructure wherein at least 80% of the butadiene repeat units are cis 1,4-isomeric units. In most cases, the high cis 1,4-polybutadiene will contain at least about 90% cis 1,4-isomeric polybutadiene units. The high cis 1,4-polybutadiene can be prepared by solution polymerization utilizing a catalyst consisting of (1) an organoaluminum compound, (2) an organonickel compound and (3) a hydrogen fluoride complex as described in U.S. Pat. No. 3,856,764.

These styrene-isoprene rubber containing blends can be compounded utilizing conventional ingredients and standard techniques. For instance, the styrene-isoprene rubber containing blends will typically be blended with carbon black and/or silica fillers, sulfur, accelerators, oils, waxes, scorch inhibiting agents and processing aids. In most cases, the styrene-isoprene containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 95 phr being preferred. In most cases, at least some carbon black will be utilized in the filler. The filler can, of course, be comprised totally of carbon black. Silica can be included in the filler to improve tear resistance and heat build-up. Clays and/or talc can be included in the filler to reduce cost.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The SIR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The styrene-isoprene rubber containing rubber blends of this invention can be used in tire treads in conjunction with ordinary tire manufacturing techniques. Tires are built utilizing standard procedures with the styrene-isoprene rubber blend simply being substituted for the rubber compounds typically used as the tread rubber. After the tire has been built with the styrene-isoprene rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, 2,300 grams of a silica/alumina/ molecular sieve/NaOH dried premix containing 19.5 weight percent styrene/isoprene mixture in hexane was charged into a 1-gallon (3.8 liter) reactor. The ratio of styrene to isoprene was 10:90. After the impurity level of 2 ppm being determined, 4.56 ml of MTE (methyl tetrahydrofurfuryl ether, 1.0M in hexane) and 1.8 ml of a 1.0M solution of n-butyl lithium (in hexane, 1.54 ml for initiation and 0.26 ml for scavenging the premix) were added to the reactor. The molar ratio of modifier to n-butyl lithium (n-BuLi) was 3:1.

The polymerization was allowed to proceed at 70° C. for 2 hours. The GC analysis of the residual monomers contained in the polymerization mixture indicated that the polymerization was complete at this time. Three ml of 1M ethanol solution (in hexane) was added to the reactor to shortstop the polymerization and polymer was removed from the reactor and stabilized with 1 phm of antioxidant. After evaporating hexane, the resulting polymer was dried in a vacuum oven at 50° C.

The styrene-isoprene copolymer rubber (SIR) produced was determined to have a glass transition temperature (Tg) at −13° C. It was then determined to have a microstructure which contained 46 percent 3,4-polyisoprene units, 39 percent 1,4-polyisoprene units, percent 1,2-polyisoprene units and 10 percent random polystyrene units. The Mooney viscosity (ML-4) was 83 for this SIR.

EXAMPLE 2

The procedure described in Example 1 was utilized in these examples except that the MTE/n-BuLi ratio was changed from 3:1 to 2.5:1. The glass transition temperatures, Mooney ML-4 viscosities, and microstructures of the resulting SIR are listed in Table I.

TABLE I

| Example Number | Styrene/ Isoprene Ratio | MTE/ n-BuLi Ratio | Tg (C.) | ML-4 (100 C.) | Microstructure (%) | | | |
|---|---|---|---|---|---|---|---|---|
| | | | | | 3,4- PI | 1,4- PI | 1,2- PI | Sty |
| 1 | 10:90 | 3:1 | −13 | 83 | 46 | 39 | 5 | 10 |
| 2 | 10:90 | 2.5:1 | −18 | 82 | 43 | 43 | 4 | 10 |

EXAMPLES 3–4

The procedure described in Example 1 was utilized in these examples except that the ETE (ethyl tetrahydrofurfuryl ether) was used as the modifier and the modifier/n-BuLI ratio was changed from 3:1 to 5:1 and 10:1. The Tg's and microstructures of these SIRs are listed in TABLE II.

TABLE II

| Example Number | Styrene/ Isoprene Ratio | ETE/ n-BuLi Ratio | Tg (C.) | ML-4 (100 C.) | Microstructure (%) | | | |
|---|---|---|---|---|---|---|---|---|
| | | | | | 3,4- PI | 1,4- PI | 1,2- PI | Sty |
| 3 | 10:90 | 5:1 | −5 | 74 | 54 | 30 | 6 | 10 |
| 4 | 10:90 | 10:1 | +2 | 75 | 58 | 23 | 8 | 11 |

EXAMPLE 5

The procedure described in Example 3 was utilized in this example except that the HTE (hexyl tetrahydrofurfuryl ether) was used as the modifier. The Tg and Mooney ML-4 viscosity of this SIR are −8° C. and 84, respectively.

EXAMPLES 6–8

The procedure described in Examples 2–3 was utilized in these examples except that the ETE/n-BuLi ratio was changed to 2.5:1, 4:1 and 5:1 and the ratio of styrene to isoprene in the premix was from 10:90 to 5:95. Their Tg's and microstructures are listed in TABLE III.

TABLE III

| Example Number | Styrene/ Isoprene Ratio | ETE/ n-BuLi Ratio | Tg (C.) | ML-4 (100 C.) | Microstructure (%) | | | |
|---|---|---|---|---|---|---|---|---|
| | | | | | 3,4- PI | 1,4- PI | 1,2- PI | Sty |
| 6 | 5:95 | 2.5:1 | −16 | 80 | 50 | 40 | 5 | 5 |
| 7 | 5:95 | 4:1 | −10 | 75 | 57 | 32 | 6 | 5 |
| 8 | 5:95 | 5:1 | −5 | 76 | 60 | 28 | 7 | 5 |

EXAMPLES 9–10

The procedure described in Examples 2–3 was utilized in these examples except that the styrene to isoprene ratio was changed from 10:90 to 15:85 and the ETE/n-BuLi ratios used were 2:1 and 5:1. The Tg's and microstructures of these SIRs are listed in TABLE IV.

TABLE IV

| Example Number | Styrene/ Isoprene Ratio | ETE/ n-BuLi Ratio | Tg (C.) | ML-4 (100 C.) | Microstructure (%) | | | |
|---|---|---|---|---|---|---|---|---|
| | | | | | 3,4- PI | 1,4- PI | 1,2- PI | Sty |
| 9 | 15:85 | 2:1 | −14 | 67 | 43 | 37 | 4 | 16 |
| 10 | 15:85 | 5:1 | −3 | 76 | 53 | 26 | 6 | 15 |

EXAMPLE 11

The procedure described in Example 10 was utilized in this example except that the polymerization temperature was changed from 70° C. to 50° C. The Tg and microstructure of this SIR are listed in TABLE V.

TABLE V

| Example Number | Styrene/ Isoprene Ratio | ETE/ n-BuLi Ratio | Tg (C.) | ML-4 (100 C.) | Microstructure (%) | | | |
|---|---|---|---|---|---|---|---|---|
| | | | | | 3,4-PI | 1,4-PI | 1,2-PI | Sty |
| 11 | 15:85 | 5:1 | +6 | 74 | 60 | 17 | 8 | 15 |

EXAMPLE 12–15

This invention relates to a pneumatic tire with a tread composed of a blend of at least three rubbers, including high Tg styrene/isoprene copolymer and at least two additional diene-based rubbers; such as, cis 1,4-polybutadiene, styrene/butadiene copolymers (prepared by solution or emulsion polymerization methods), cis 1,4-polyisoprene, high and medium vinyl (1,2-) polybutadiene, styrene/isoprene/butadiene rubber, epoxidized natural rubber, carboxylated nitrile rubber, isoprene/butadiene copolymers and acrylonitrile/styrene/butadiene rubber.

The high Tg SIR added benefits, including handling, traction and treadwear, without significantly affecting rolling resistance. When compared to high Tg 3,4-polyisoprene in a typical tread recipe, the SIR copolymer improved the carbon black incorporation into the high Tg polymer phase, thus resulting in improved tire handling and treadwear. These treads contained 30 to 80 parts of carbon black and 10 to 20 parts of silica and bis-(3-triethoxysilylpropyl)tetrasulfide as a silane coupling agent. Examples 12 and 14 were conducted as controls and did not contain any of the SIR of this invention in the blends make.

| TIRE TEST RESULTS | | | | |
|---|---|---|---|---|
| Example Number | 12 | 13 | 14 | 15 |
| Cis 1,4-Polybutadiene | 35.0 | 35.0 | — | — |
| Natural Rubber | 40.0 | 40.0 | 30.0 | 30.0 |
| S-SBR | 15.0 | 15.0 | 50.0 | 50.0 |
| 3,4-Polyisoprene | 10.0 | — | 20.0 | — |
| Styrene/Isoprene (SIR) | — | 10.0 | — | 20.0 |
| % Carbon Black in 3,4-PI or SIR | 1.2 | 23.1 | 6.1 | 9.0 |
| Tire Treadwear | 100 | 105 | 100 | 107 |
| Rolling Resistance | 100 | 98 | 100 | 99 |
| Traction | 100 | 100 | — | — |
| Compound Processing | — | Better | — | — |
| Tire Handling | — | Better | — | Better |

In this series of tire tests tire treadwear, rolling resistance, and traction characteristics of the control tires (Examples 12 and 14) were normalized to a value of 100 for comparative purposes. As can be seen from the table above, the tire tread compounds made with the SIR of this invention showed better tire treadwear and handling characteristics that the control tires. Example 13 showed better compound processing over the blend made for utilization in Example 12. The tires made with the tire tread compounds made with the SIR of this invention also showed similar rolling resistance and traction characteristics as compared to the control tires. This series of examples shows that the SIR of this invention can be included in tire tread compounds to improve tire treadwear and handling characteristics without sacrificing rolling resistance or traction characteristics.

EXAMPLE 16–21

In this set of experiments the SIR of this invention was evaluated in tire tread compounds in place of styrene-butadiene rubber made by solution polymerization (S-SBR). When the SIR of this invention was evaluated in place of solution SBR in compounds containing micropearl silica, 50/50 carbon black/silica and all carbon black, significant increases in tan delta at 0° C. and dynamic stiffness (E*) were observed, suggesting improved tire traction and handling. Furthermore, Example 17 (which contained SIR) had a significantly higher tan delta at 0° C. and lower tan delta at 60° C. compared to Example 18, 20 and 21 suggesting much improved traction and rolling resistance with a tread which contains silica as the major reinforcing agent.

| LABORATORY COMPOUND RESULTS | | | | | | |
|---|---|---|---|---|---|---|
| Example Number | 16 | 17 | 18 | 19 | 20 | 21 |
| S-SBR | 70.0 | 50.0 | 70.0 | 50.0 | 70.0 | 50.0 |
| Cis 1,4-Polybutadiene | 30.0 | 30.0 | 30.0 | 30.0 | 30.0 | 30.0 |
| Sytrene/Isoprene | — | 20.0 | — | 20.0 | — | 20.0 |
| Zeosil 1165MP Silica | 70.0 | 70.0 | 35.0 | 35.0 | — | — |
| N299 Carbon Black | — | — | 35.0 | 35.0 | 70.0 | 70.0 |
| Degussa X50S Coupling Agent | 11.0 | 11.0 | 5.5 | 5.5 | — | — |
| Modulus, MPa | | | | | | |
| 100% | 1.9 | 1.9 | 1.6 | 1.6 | 1.6 | 1.6 |
| 300% | 8.7 | 8.6 | 7.3 | 7.1 | 5.9 | 5.9 |
| Break Strength, MPa | 18.9 | 17.5 | 17.2 | 17.0 | 14.6 | 14.7 |
| Elongation @ Break, % | 561 | 549 | 604 | 623 | 672 | 682 |
| Rebound, % | | | | | | |

-continued

| LABORATORY COMPOUND RESULTS | | | | | | |
|---|---|---|---|---|---|---|
| Example Number | 16 | 17 | 18 | 19 | 20 | 21 |
| Room Temperature | 48 | 40 | 43 | 36 | 34 | 27 |
| 100° C. | 65 | 63 | 57 | 55 | 48 | 48 |
| Hardness, Shore A | | | | | | |
| Room Temperature | 58 | 57 | 57 | 56 | 59 | 60 |
| 100° C. | 56 | 56 | 51 | 51 | 52 | 52 |
| DIN Abrasion, cc (Volume Loss) | 79 | 85 | 65 | 90 | 88 | 97 |
| tan delta, 0° C. | 0.196 | 0.337 | 0.181 | 0.348 | 0.114 | 0.237 |
| tan delta, 60° C. | 0.086 | 0.088 | 0.119 | 0.147 | 0.128 | 0.136 |
| E* × 10 − 8, 0° C. | 1.47 | 1.99 | 1.96 | 2.51 | 4.36 | 5.19 |
| E* × 10 − 7, 60° C. | 7.06 | 7.40 | 7.49 | 8.68 | 17.7 | 17.6 |

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having an outer circumferential tread where said tread is a sulfur cured rubber composition comprised of, based on 100 parts by weight of rubber, (a) from about 5 parts to about 55 parts of styrene-isoprene rubber made by a process which comprises copolymerizing a monomer mixture containing from about 2 weight percent to about 15 weight percent styrene monomer and from about 85 weight percent to about 98 weight percent isoprene monomer in an organic solvent in the presence of a catalyst system which is comprised of (a) a lithium initiator and (b) a modifier having the structural formula:

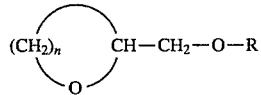

wherein n represents an integer within the range of 3 to 6, wherein R represents an alkyl group containing from 1 to about 10 carbon atoms, and wherein the molar ratio of the modifier to the lithium initiator is within the range of 2:1 to 40:1, (b) from about 10 parts to about 40 parts of natural rubber, (c) from about 15 parts to about 40 parts of styrenebutadiene rubber, (d) front about 20 parts to about 35 parts of high cis-1,4polybutadiene rubber, (e) from about 30 to about 80 parts of carbon black, and (f) from about 10 to about 20 parts of silica.

2. A pneumatic tire as specified in claim 1 wherein the styrene-isoprene rubber contains from about 90 weight percent to about 97 weight percent isoprene and from about 3 weight percent to about 10 weight percent styrene.

3. A pneumatic tire as specified in claim 1 wherein the styrene-isoprene robber contains from about 93 weight percent to about 96 weight percent isoprene and from about 4 weight percent to about 7 weight percent styrene.

* * * * *